(12) United States Patent
Cheng et al.

(10) Patent No.: US 11,543,667 B2
(45) Date of Patent: Jan. 3, 2023

(54) HEAD-MOUNTED DISPLAY GENERATED STATUS MESSAGE

(71) Applicant: HEWLETT-PACKARD DEVELOPMENT COMPANY, L.P., Spring, TX (US)

(72) Inventors: Yow Wei Cheng, Taipei (TW); Kuanlin Li, Taipei (TW)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/331,047

(22) Filed: May 26, 2021

(65) Prior Publication Data

US 2022/0382055 A1 Dec. 1, 2022

(51) Int. Cl.
*G02B 27/01* (2006.01)
(52) U.S. Cl.
CPC .. *G02B 27/0172* (2013.01); *G02B 2027/0178* (2013.01); *G02B 2027/0187* (2013.01)
(58) Field of Classification Search
USPC .......................................................... 345/8
See application file for complete search history.

(56) References Cited

U.S. PATENT DOCUMENTS

| | | | | |
|---|---|---|---|---|
| 2011/0194029 A1* | 8/2011 | Herrmann | ............ | H04N 13/398 348/569 |
| 2012/0302289 A1* | 11/2012 | Kang | ............ | G06F 3/017 455/557 |
| 2013/0127980 A1* | 5/2013 | Haddick | ............ | G06F 3/013 348/14.08 |
| 2014/0013141 A1* | 1/2014 | Heo | ............ | G06F 1/3215 713/323 |
| 2014/0375540 A1* | 12/2014 | Ackerman | ............ | G02B 27/0172 345/156 |
| 2015/0212576 A1* | 7/2015 | Ambrus | ............ | G06F 3/0482 345/156 |
| 2017/0212717 A1* | 7/2017 | Zhang | ............ | G02B 27/017 |
| 2018/0373318 A1* | 12/2018 | Yang | ............ | G06F 3/012 |
| 2019/0129182 A1* | 5/2019 | Hu | ............ | G06F 3/011 |
| 2020/0320955 A1* | 10/2020 | Kiser | ............ | G09G 5/006 |
| 2020/0348524 A1* | 11/2020 | Chen | ............ | G02C 11/10 |
| 2021/0199964 A1* | 7/2021 | Atkinson | ............ | H04N 13/139 |

* cited by examiner

*Primary Examiner* — Chineyere D Wills-Burns
(74) *Attorney, Agent, or Firm* — Quarles & Brady LLP

(57) ABSTRACT

In an example in accordance with the present disclosure, a display system is described. The display system includes a head-mounted display device to display visual content on a display panel. An input port receives external visual content to be displayed on the head-mounted display device from a connected computing device. The display system includes an input device on the head-mounted display device to receive input regarding a condition at the head-mounted display device. The display system includes a memory device on the head-mounted display device to store a database which holds a number of status messages related to a detected condition at the head-mounted display device. The display system also includes an image processing integrated circuit on the head-mounted display device to present the status messages on the head-mounted display device.

20 Claims, 9 Drawing Sheets

HEAD-MOUNTED DISPLAY GENERATED STATUS MESSAGE

BACKGROUND

Extended reality systems allow a user to become immersed in an extended reality environment wherein the user can interact with the extended environment. For example, a head-mounted display using stereoscopic display devices, allows a user to see, and become immersed in, any desired virtual scene. Such extended reality applications can provide visual stimuli, auditory stimuli, and/or can track user movement to create a rich immersive experience.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
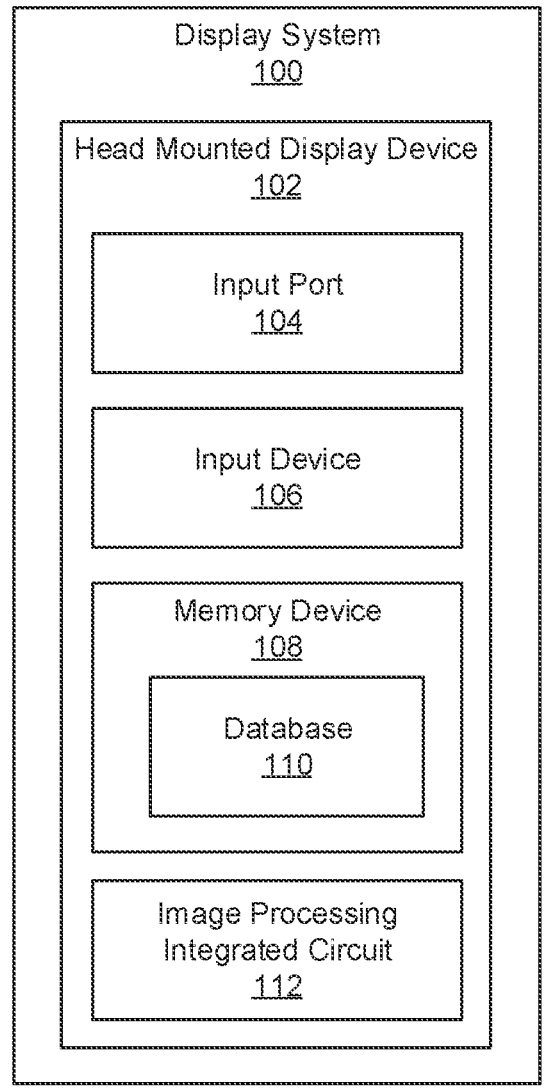
FIG. 1 is a block diagram of a display system with a head-mounted display (HMD) device for generating status messages, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Extended reality (XR) systems allow a user to become immersed in an extended reality environment wherein they can interact with the extended environment. XR systems include virtual reality (VR) systems, augmented reality (AR) systems, and mixed reality (MR) systems. Such XR systems can include extended reality headsets to generate realistic images, sounds, and other human discernable sensations that simulate a user's physical presence in a virtual environment presented at the headset. A VR system includes physical spaces and/or multi-projected environments. AR systems may include systems and devices that implement direct and/or indirect displays of a physical, real-world environment whose elements are augmented by computer-generated sensory input such as sound, video, graphics and/or GPS data. MR systems merge real and virtual worlds to produce new environments and visualizations where physical and digital objects co-exist and interact in real time. For simplicity, VR systems, AR systems, and MR systems are referred to herein as XR systems.

While XR systems have undoubtedly generated a new and exciting field of information presentation and have greatly expanded the opportunities and capabilities for information display, some developments may further enhance their use and implementation in a variety of industries.

For example, some XR systems perform stereoscopic rendering which provides depth to flat images. That is, humans view the world through two eyes, each eye seeing the same content, but at slightly different angles. This effect is on display when looking at an object in front of a user's face. When looking at the object with just one eye and then looking at the same object with just the other eye, the object appears to move. Human brains combine the information collected by each eye to form a scene of the world we see, wherein the scene has depth. A stereoscopic XR system recreates this operation of the brain by rendering a scene twice, once from the perspective of the user's left eye and once from the perspective of the user's right eye. The two images are similar but from slightly different angles. The XR system then presents these images to respective eyes, (i.e., right eye image to the right eye and left eye image to the left eye) to give a sense of depth to the flat images. That is, stereoscopic rendering includes generating a left eye image and a right eye image and presents each image to the respective eye. The different angle with which the left eye and right eye image are rendered is based on the distance between the pupils of the eyes, i.e., the interpupillary distance (IPD) and may be different per user. For example, the IPD of a user may vary and an XR system may have an IPD adjustment range of between 60 millimeters and 68 millimeters. If a user calibrates an XR system for an IPD of 60 millimeters, a user with a larger IPD may view the image as fuzzy. Accordingly, while stereoscopic images provide an immersive experience, incorrect calibration may lead to a reduced user experience.

As such, head-mounted display (HMD) devices may accommodate different IPDs. Specifically, the HMD device may have an adjustment device such that the left eye and right eye images are adjusted until they match the user's IPD and presents an image that is clear and in focus. In some examples, the IPD adjustment device may be a knob, slider or other mechanical input device. In other examples, the IPD adjustment device is electronic. The system provides feedback to the user of the selected IPD for the system. For example, the system indicates to the user the IPD position of the HMD. While such calibration is helpful in providing the user a mechanism to select an IPD that results in a high-quality image, some advancements to this area may provide for a more effective and efficient IPD adjustment.

For example, in HMDs the display contents may be provided by a host computing device such as a personal computer, all-in-one device, gaming console, smartphone, or even a remote video tethering source. This provided content includes an IPD reporting system that indicates to the user the IPD that the XR system is using to present the content. In many instances, a content provider may not provide for the display of IPD configuration changes. That is, such external content may not provide any indication to a user of an IPD adjustment. As a result, a user may not be provided with a visual indication as they are adjusting the IPD setting of the HMD. Even if the host computing device does provide a notification of IPD, if the host computing device connection is lost, any visual or auditory indication of IPD calibration position would not be presented to the user. Moreover, different content providers may provide different IPD reporting systems, which may confuse a user.

As such, the present specification provides an IPD reporting mechanism that is provided entirely on the HMD rather than relying on the connected computing device. Such a system is thus independent of any connected host computing device. By using low frequency channel communication such as the inter-integrated circuit (I2C) channel built in the HMD, an on-screen display may be generated on the HMD panel, entirely from the HMD device. As such, an indication of the IPD value of the HMD device can be presented, even without a graphic signal from the host computing device. As the IPD measurements are presented on the HMD, a consistent IPD reporting system is presented, regardless of the external content provider. With an accurate IPD notification system, users may be ensured a high-quality video environment.

While specific reference is made to an IPD status message, such a system of an entirely on-HMD notification system may be used for other status messages. Examples include messages related to system overheat, lost display signal, disconnected network, or low battery to name a few.

Specifically, the present specification describes a display system. The display system includes a head-mounted display (HMD) device to display visual content on a display panel and an input port to receive external visual content to be displayed on the HMD device from a connected computing device. The display system also includes an input device on the HMD device to receive input regarding a condition at the HMD device. The display system also includes a memory device on the HMD device. The memory device stores a database that has a number of status messages related to a detected condition at the HMD device. An image processing integrated circuit on the HMD device presents the status messages on the HMD device.

The present specification also describes a method. According to the method, an input is received form an input device on the HMD. The input indicates an IPD of the HMD. A status message to be displayed on the HMD is extracted from a memory device which is also on the HMD. The status message is based on the IPD and indicates the IPD. The status message of the IPD is displayed on a display panel of the HMD.

The present specification also describes, a non-transitory machine-readable storage medium encoded with instructions executable by a processor. The machine-readable storage medium includes instructions to 1) receive external visual content from a connected computing device to display on an HMD device, and 2) receive input from an input device on the HMD device which input indicates an IPD of the HMD device. The instructions are also executable by the processor to map a received IPD value to a status message stored on a database, which status message displays the mapped IPD. The instructions are executable by the processor to 1) extract from the database on the HMD device, a status message mapped to the received IPD value and 2) present the status message on the HMD device, independent of the external visual content signal from the connected computing device.

In summary, using such a system, method, and machine-readable storage medium may, for example, 1) provide IPD, and other, status messages, even when a video cable from a host computing device is disconnected; 2) provide a consistent and comprehensive reporting system; and 3) does not overwhelm the HMD hardware components. However, it is contemplated that the devices disclosed herein may address other matters and deficiencies in a number of technical areas, for example.

As used in the present specification and in the appended claims, the term "a number of" or similar language is meant to be understood broadly as any positive number including 1 to infinity.

Further, as used in the present specification and in the appended claims, the term "panel" refers to a surface on which the visual content is presented. In a stereoscopic display, the panel may include sub-panels, a left eye sub-panel and a right eye sub panel, each of which present a separate image to a respective eye.

Figure 2:
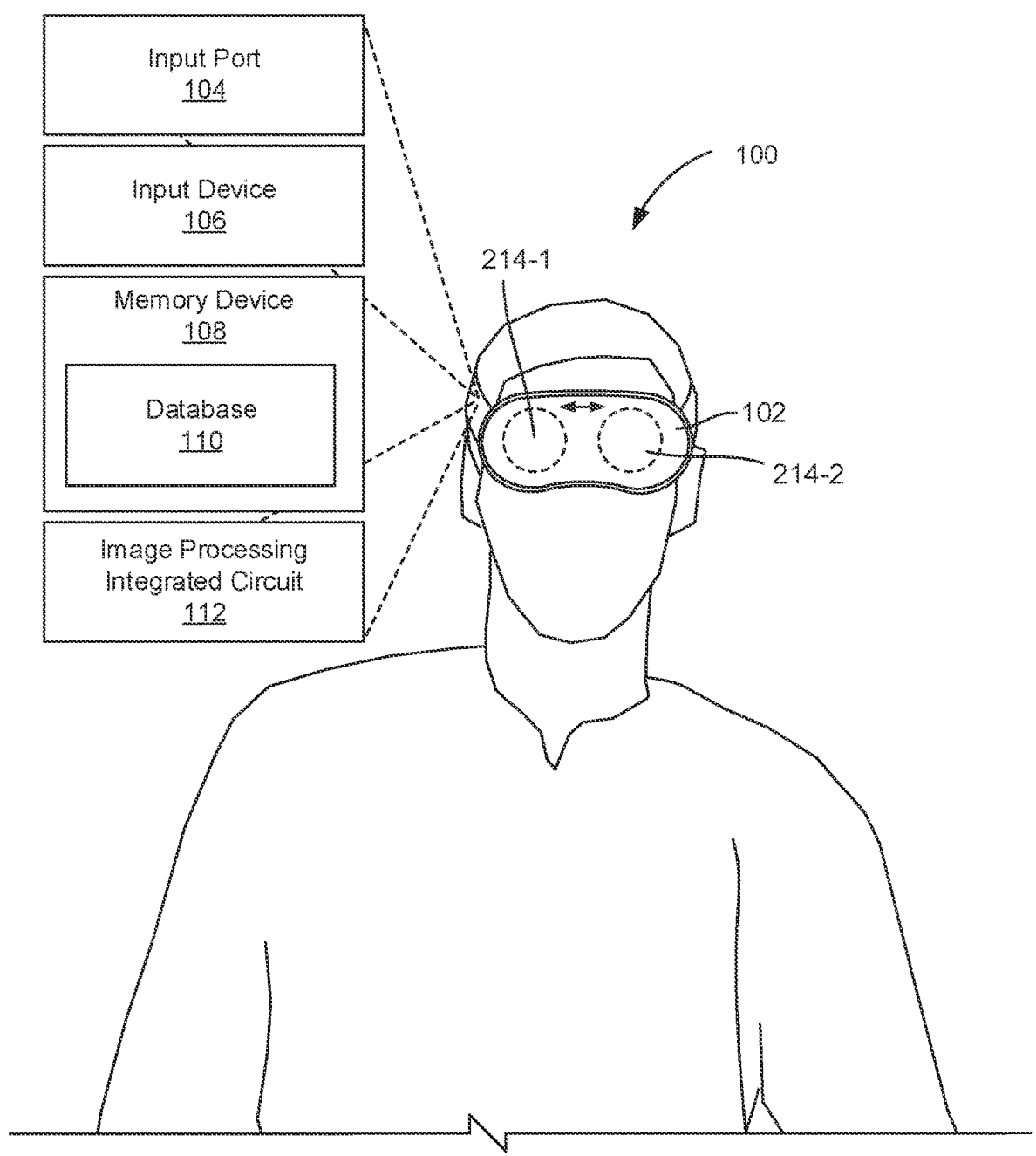
FIG. 2 is a diagram of a display system with a HMD device for generating status messages, according to an example of the principles described herein.

FIG. 1 is a block diagram of a display system (100) with an HMD device (102) for generating status messages, according to an example of the principles described herein. The display system (100) includes a head-mounted display (HMD) device (102) to display visual content on a display panel. An HMD device (102) covers the eyes of the user and presents the visual information in an enclosed environment formed by the HMD device (102) housing and the user's face. An example of such an HMD device (102) is depicted in FIG. 2 below. As described above, the term extended reality (XR) encompasses, VR, MR, and AR such that an extended reality HMD encompasses VR HMDs, MR HMDs, and AR HMDs.

External content such as digital scenes may be provided by an external computing device such as a PC, all-in-one device, gaming console or the like. Accordingly, the HMD device (102) may include an input port (104) such as a display port to receive the external visual content to be displayed on the HMD device (102) from a connected computing device. When such a host computing device connector is removed from the input port (104), the HMD device (102) may not be able to receive video signal. Accordingly, if the host computing device rather than the HMD device (102) presents the IPD or other status message, the status messages may not be presented to a user of the HMD device (102) unless connected to the host computing device. Accordingly, the display system (100) of the present specification provides for status messages to be provided to the HMD device (102) even when not connected to an external content source on account of such status message being generated and stored on the HMD device (102) itself.

In some examples, the HMD device (102) is stereoscopic, meaning that it presents content that has been rendered stereoscopically. However, the present display system (100) may be implemented in non-stereoscopic display devices as well. In this example certain content is rendered in a first format and other content is rendered in a different format.

The display system (100) also includes an input device (106) on the HMD device (102) to receive input regarding a condition at the HMD device (102). As described above, in some examples the input device (106) may be an inter-pupillary distance (IPD) adjustment device such as a slider or knob. In other examples, the input device (106) may be of a different type. For example, the input device (106) may be a thermal sensor. In this example, a related status message may indicate a temperature of the HMD device (102) or may be a warning that an overheat temperature has been reached.

In another example, the input device (106) may be a gyroscope wherein an associated status message may indicate that the HMD device (102) and the user, are in a precarious position, such as about to tip over. In yet another example, the input device (106) may relate to a connection of the HMD device (102). For example, the input device (106) may be a communication signal sensor and/or a network connectivity sensor, wherein an associated status message may indicate a lost connection or that the HMD device (102) is disconnected from the network. Other examples of input devices (106) include a battery sensor and an optical sensor.

The display system (100) also includes a memory device (108) that stores a database (110) of status messages related to a detected condition at the HMD device (102). The memory device (108), rather than being remote from the HMD device (102), may be found on the HMD device (102) itself. As such, rather than relying on the host computing device to provide a notification of the IPD, or other detected condition, the HMD device (102) itself determines the value and provides a notification to the user of such.

As a particular example, the database (110) may include a number of static images, each relating to a measured value of a condition. When the input device (106) detects a certain condition, an associated static image relating to the measured condition is presented. For example, the database (110) may include a number of static images, each indicating a different IPD value. When the input device (106) records an IPD value of, for example, 63.5 mm, the corresponding status message is retrieved from the database (110) and presented to the user.

The memory device (108) may include a computer-readable storage medium, which computer-readable storage medium may contain, or store computer-usable program code for use by or in connection with an instruction execution system, apparatus, or device. The memory device (108) may take many types of memory including volatile and non-volatile memory. For example, the memory device (108) may include Random Access Memory (RAM), Read Only Memory (ROM), optical memory disks, and magnetic disks, among others. The executable code may, when executed by the respective component, cause the component to implement the functionality described herein.

The HMD device (102) also includes an image processing integrated circuit (112), also on the HMD device (102) itself. The image processing integrated circuit (112) presents the status message on the HMD device (102). Specifically, the image processing integrated circuit (112) is coupled to the input device (106). As the input device (106) detects a certain condition, such as a particular IPD value as a user manipulates the IPD adjustment device, this value is passed to the image processing integrated circuit (112). The image processing integrated circuit (112) then extracts the associated status message from the database (110) and presents it on the display panel of the HMD device (102) such that a user receives notification of the IPD adjustment of the IPD device.

The integrated circuits as described herein may include a processor and other circuitry to retrieve executable code from memory and execute the executable code. As specific examples, the integrated circuits as described herein may include computer-readable storage medium, computer-readable storage medium and a processor, an application-specific integrated circuit (ASIC), a semiconductor-based microprocessor, a central processing unit (CPU), and a field-programmable gate array (FPGA), and/or other hardware device.

As a specific example, the input device (106) may include a potentiometer which has different voltage level outputs to indicate a position of a slider bar. This slider bar position and associated voltage level may therefore reflect the distance/position of the eye cups of the HMD device (102). A micro control unit (MCU) may retrieve this voltage level value with an analog input pin and transform it into an IPD value. The status messages in the database (110) may be indexed by IPD value such that a status message that corresponds to and indicates the IPD value may be selected for presentation. As the number of detected conditions is finite, the database (110) may include a finite set of status messages to be displayed.

FIG. 2 is a diagram of a display system (100) with an HMD device (102) for generating status messages, according to an example of the principles described herein. As described above, the HMD device (102) may be worn by a user to generate visual, auditory, and other sensory environments. In one example, the HMD device (102) may be a stereoscopic display device.

As described above, a stereoscopic HMD device (102) renders a scene twice, once from the perspective of the user's left eye and once from the perspective of the user's right eye. Given different eye positions of a user, the angle from which the left eye image and right eye image are rendered may vary. That is, a user may be able to detect lens distortion when the stereoscopic angle does not align with their own IPD. As such, the HMD device (102) may include eye cups (214-1, 214-2) that may be adjustable as depicted in FIG. 2 by a dual-sided arrow to accommodate different users that may have different IPD. The position of the eye cups (214-1, 214-2) may be adjusted via the input device (106).

As described above, each user may have a different IPD and as such, the angle at which each stereoscopic image is rendered to provide a clear picture may vary between users. This rendering angle may be determined based on the position of the eye cups (214). For example, a user, via the input device (106) such as a slider bar or knob, may adjust the eye cups (214) to be comfortable on their face and also to produce a clear stereoscopic image. The input device (106) may be coupled to a potentiometer that outputs a voltage value based on a position of the slider bar which indicates a distance between the eye cups (214). This value may be passed to the host computing device which adjusts the rendering of the external content based on the position, or IPD of the eye cups (214). This value is also passed to the image processing integrated circuit (112) such that the status message may be displayed.

In this example, as each frame has two images that are similar but from slightly different angles, the database (110) may include a left eye image and a right eye image for each status message. The HMD device (102) then presents these status message images to respective eyes, (i.e., right eye image to the right eye and left eye image to the left eye) to give a sense of depth to the flat images. That is, a stereoscopic rendering includes generating a left eye image and a right eye image and presents each image to the respective eye.

To reduce a load on the image processing integrated circuit (112), rather than stereoscopically rendering the status messages two times, the messages may be pre-processed for lens distortion, two-eyes transportation and XR stereo transformation. For example, optical parameters may be collected for hardware-related image transformations. These optical parameters may be applied to status messages to generate distorted message images for both the left eye and right eye sub-panels respectively. As such, the database (110) may store 1) a number of status messages, each corresponding to a different input device (106) output value, and 2) a number of left eye and right eye images for each status message, with the different left eye and right eye images accounting for hardware component distortion, such as eye cup position, eye cup distortion, etc. By pre-processing the status message images, computational resources of the HMD device (102), i.e., the image processing integrated circuit (112), are preserved.

As depicted in FIG. 2, the components that generate the status message are found on the HMD device (102) itself, such that the HMD device (102) may generate and present a notification of a measured condition at the HMD device (102) without relying on a connected computing device.

While FIG. 2 depicts a particular HMD device (102) with particular characteristics such as a mechanical IPD adjustment, i.e., mechanically-moveable eye cups (214) and separate panels, in some examples the HMD device (102) may have different characteristics, such as an electronic IPD adjustment and electronic stereoscopic rendering system.

Figure 3:
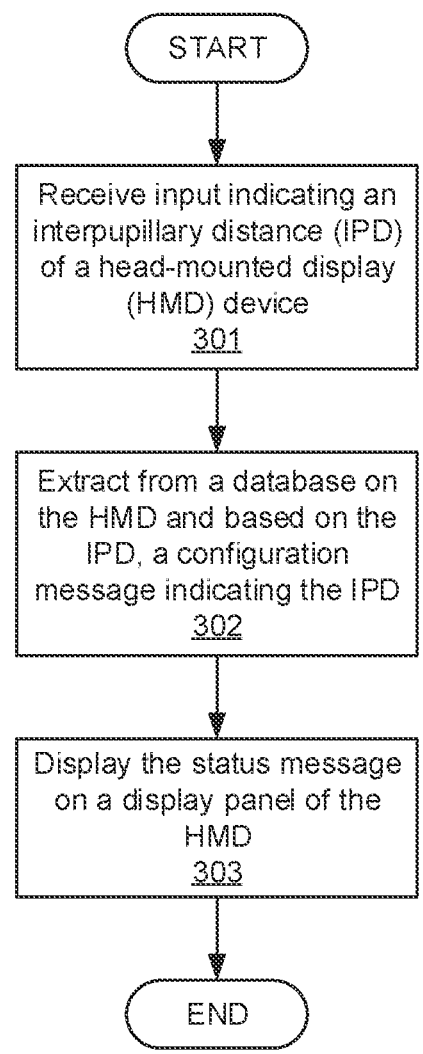
FIG. 3 is a flowchart of a generating status messages on a HMD device, according to an example of the principles described herein.

FIG. 3 is a flowchart of a method (300) for generating status messages on an HMD device (FIG. 1, 102), according to an example of the principles described herein. While FIG. 3 depicts particular operations occurring in a particular order. In some examples, operations may be performed in a different order or simultaneously.

According to the method (300), an input is received (block 301), which input indicates an IPD of the HMD device (FIG. 1, 102). The HMD device (FIG. 1, 102) may have adjustable sub-panels that present the stereoscopically-rendered content to the left eye and right eye respectively. As each user may have different IPDs, the sub-panels are adjustable to accommodate the different physical IPD of the user. That is, the user may adjust the position of the sub-panels to match their IPD. Such adjustment may be based on user feedback. That is, as a user adjusts the slider, the stereoscopic image rendering engine renders the external content. A user may select a particular sub-panel position as a desired setting for the HMD device (FIG. 1, 102) when the visual content is at its sharpest. The input device (FIG. 1, 106) may pass an output voltage value indicative of this position. This output value is received (block 301) at the HMD device (FIG. 1, 102). While FIG. 3 depicts an IPD input, as described above, a variety of other inputs may be received (block 301) from a number of other input devices (FIG. 1, 106).

The image processing integrated circuit (FIG. 1, 112) extracts (block 302) a status message to display on the HMD device (FIG. 1, 102). Specifically, the image processing integrated circuit (FIG. 1, 112) receives the input device (FIG. 1, 104) output and following a mapping between the output value and a particular status message, selects a status message from the database (FIG. 1, 110). That is, each status message may be indexed by a particular output value/IPD measurement. As such, the image processing integrated circuit (FIG. 1, 112) extracts (block 302) from the database (FIG. 1, 110) on the HMD device (FIG. 1, 102) and based on the IPD, a status message which indicates the IPD.

Figure 4:
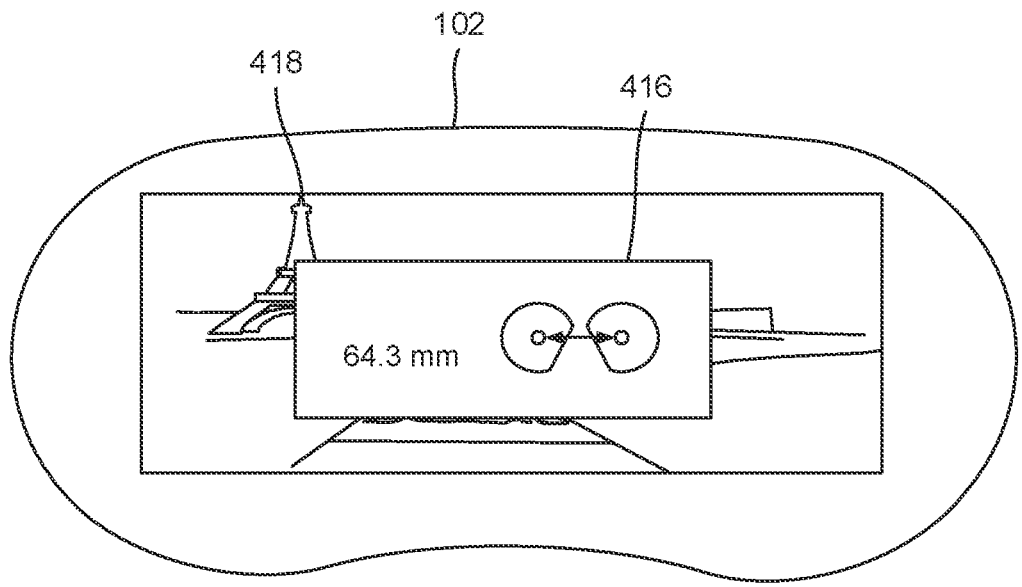
FIG. 4 is a diagram of a status message on a HMD device, according to another example of the principles described herein.

The HMD device (FIG. 1, 102) then displays (block 303) the status message of the IPD on a display panel of the HMD device (FIG. 1, 102). Such display may take a variety of forms. For example, the status message may be superimposed over the external visual contents that are provided by a computing device connected to the HMD device (FIG. 1, 102). Such an example is depicted in FIG. 4. This may include overriding the pixel values of the external visual content to pixels designated in the status message. That is, the status message may be made up of pixel values which together form the status message. Similarly, the external content is made up of pixels set to certain values to depict a visual scene. Accordingly, for those pixels that correspond to a status message, the image processing integrated circuit (FIG. 1, 112) may flip the associated pixels to those defined by the status message. As described above, the method (300) may be performed by the display system (FIG. 1, 100), such that the status message may be provided independent of external content provided by the connected computing device.

FIG. 4 is a diagram of a status message (416) on an HMD device (102), according to another example of the principles described herein. As described above, the status message (416) may be an on-screen display to provide a notification to the user of a detected condition. The detected condition may be of a variety of types such as a device temperature, device connectivity, and/or device power status. In the example depicted in FIG. 4, the detected condition is an interpupillary distance as recorded by an input device (FIG. 1, 106) adjustment.

Also as described above, the status message (416) may be superimposed on the display panel on top of the external visual content (418). However, as opposed to the external visual content (418), the status message (416) may be provided entirely by the HMD device (FIG. 1, 102) rather than being provide by an external visual content provider from a connected computing device. That is, when a user maneuvers the input device (FIG. 1, 106), a hardware interrupt is raised over the external content and the status message (416) is provided which notifies the user, via a status message, of the detected condition.

Figure 5:
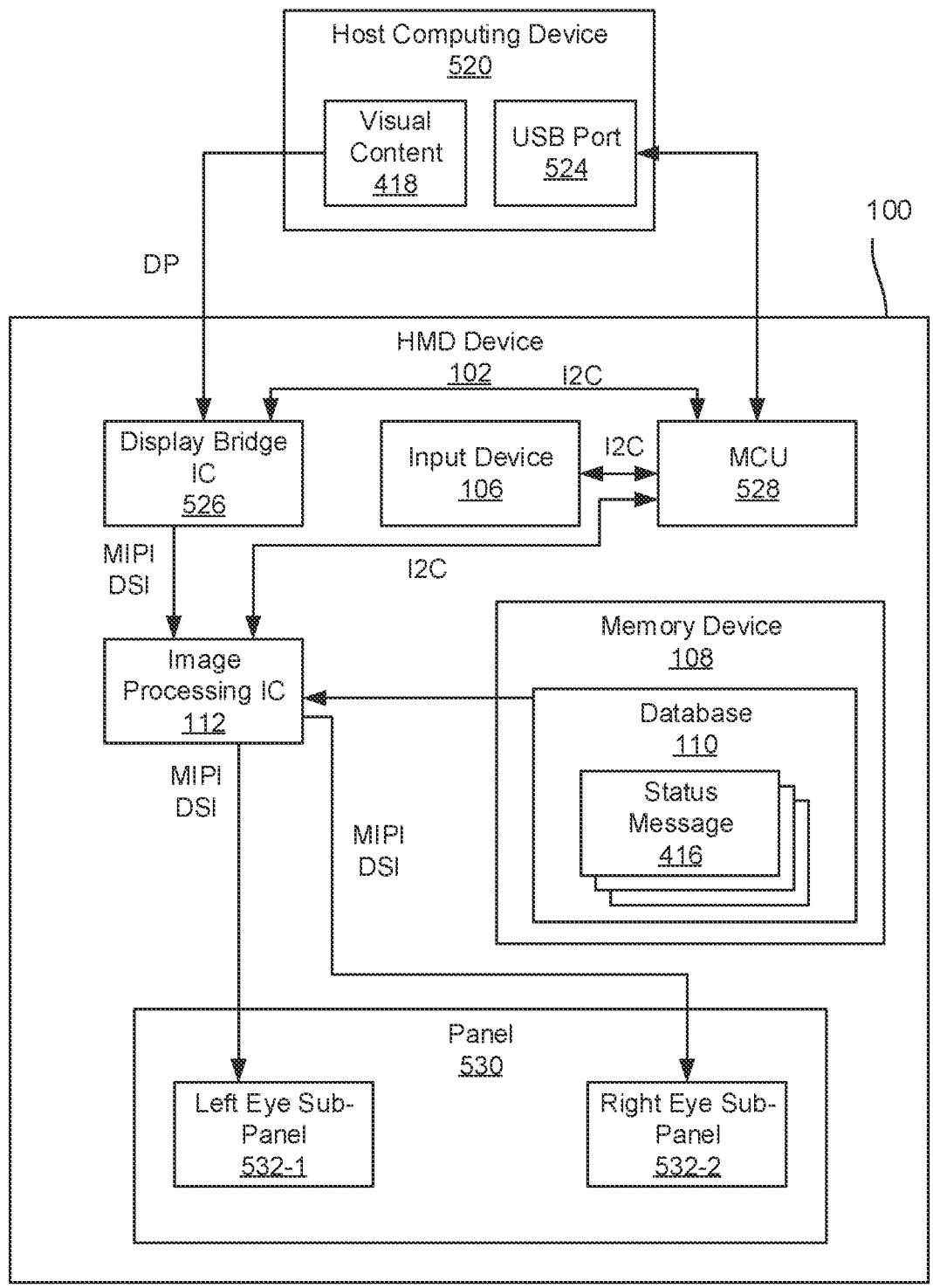
FIG. 5 is a hardware diagram of a display system with a HMD device for generating status messages, according to an example of the principles described herein.

FIG. 5 is a hardware diagram of a display system (100) with an HMD device (102) for generating status messages (416), according to an example of the principles described herein. As described above, the HMD device (102) is connected to a host computing device (520) such as a computer or gaming system that provides external content. As such, the HMD device (102) may include an input port (FIG. 1, 104) to establish a data connection wherein visual content (418) is received by the HMD device (102), which visual content (520) may be the digital scene in which the user is immersed. The host computing device (520) may also be connected to the HMD device (102) through a USB port (524).

In an example, the HMD device (102) may include a display bridge integrated circuit (526). The display bridge integrated circuit (526) may transmit the external visual content (418) to the display panel (530), and in the case of a stereoscopic display panel (530) to the left eye sub-panel (532-1) and the right eye sub-panel (532-2) specifically. In general, the display bridge integrated circuit (526) is tasked with receiving visual content (418) and converting it into a format compatible with the panel (530) and/or sub-panels (532). For example, the visual content (418) may be in a DISPLAYPORT format while the panels (530) and/or sub-panels (532) may operate with a mobile industry processor interface display serial interface (MIPI DSI) format. Accordingly, the display bridge integrated circuit (526) may convert the visual content (418) DP into MIPI DSI for the panels (530) and/or sub-panels (532).

The HMD device (102) may also include a micro control unit (MCU) (528) to receive input from the input device (106). That is, the MCU (528) may receive the output of the input device (106) which output is to trigger selection and generation of a status message (416). In an example, the MCU (528) is coupled do the input device (106) such that any input device (106) may be implemented in accordance to the principles described herein. For example, the input device (106) may be a thermal sensor. In this example, the MCU (528) may receive a message of a temperature and may have a lookup table indicating an overheat temperature. When the temperature sensor outputs a temperature greater than the overheat threshold, the MCU (528) may pass such a signal to the image processing IC (112) and an associated status message (416) may be generated. In an example where the input is an IPD adjustment, the MCU (528) may receive a message of the IPD adjustment value for the HMD device (102). In this example, the MCU (528) may pass such a signal to the image processing IC (112) and an associated status message (416) may be generated.

As described above, the hardware components of the HMD device (102) may take a variety of forms to carry out the on-board detection, generation, and presentation of status messages (416). In the example depicted in FIG. 5, the image processing integrated circuit (112) receives as input, 1) an output from the display bridge integrated circuit (526), i.e., the external visual content (418) and 2) an output from the micro control unit (528), i.e., the indication of the detected condition such as an IPD.

As described above, the memory device (108) may have a database (110) to store include a variety of status messages (416). That is, the database (110) may include a status message (416) per value of the input device (106). For example, the input device (106) may output a value indicating an IPD of 63.5 mm. This output value may map to a particular status message (416) which may be subsequently displayed. Similarly, when the input device (106) outputs a value indicating an IPD of 65 mm, a separate status message (416) may be indicated and selected. Moreover, the database (110) may include multiple status messages (416) per input value. For example, for an output value indicative of an IPD of 63.5 mm, the database (110) may include a left eye status message (416) indicating the 63.5 mm IPD and a right eye status message (416) indicating the 63.5 mm IPD. In this example, the left eye and the right eye image may be presented stereoscopically on top of the external visual content (FIG. 4, 418).

An example is now provided. In this example, the MCU (528), is the master device to communicate with various slave devices, such as the input device (106). In an example, the MCU (528) communicates with the slave devices via an inter-integrated circuit (I2C) signal. In this example, an IPD user adjustable knob/nozzle/slider may be an input device (106) which triggers an input event to the MCU (528). While in this example, the MCU (528) is passively receiving these state signals from the input device (106), in an example the MCU (528) may actively query state signals to the input device (106) to determine whether user input is detected. In either case, when user input is detected, i.e., the knob/slider/nozzle is being maneuvered by the user, the MCU (528) may pass a signal to the image processing IC (112) to overwrite the display contents coming from the display bridge IC (526) with pre-defined status messages (416). As described above, there are various ways for the image processing integrated circuit (112) to achieve this, such as using image masks to apply to the incoming frames buffer to overwrite the display contents. Another approach is to maintain multiple layers of the video stream, each layer is holding a pre-defined status message.

While FIG. 5 depicts certain protocols, these are just examples and the other similar protocols and data formats may be implemented and accounted for by the various hardware components including the image processing integrated circuit (112).

Figure 6:
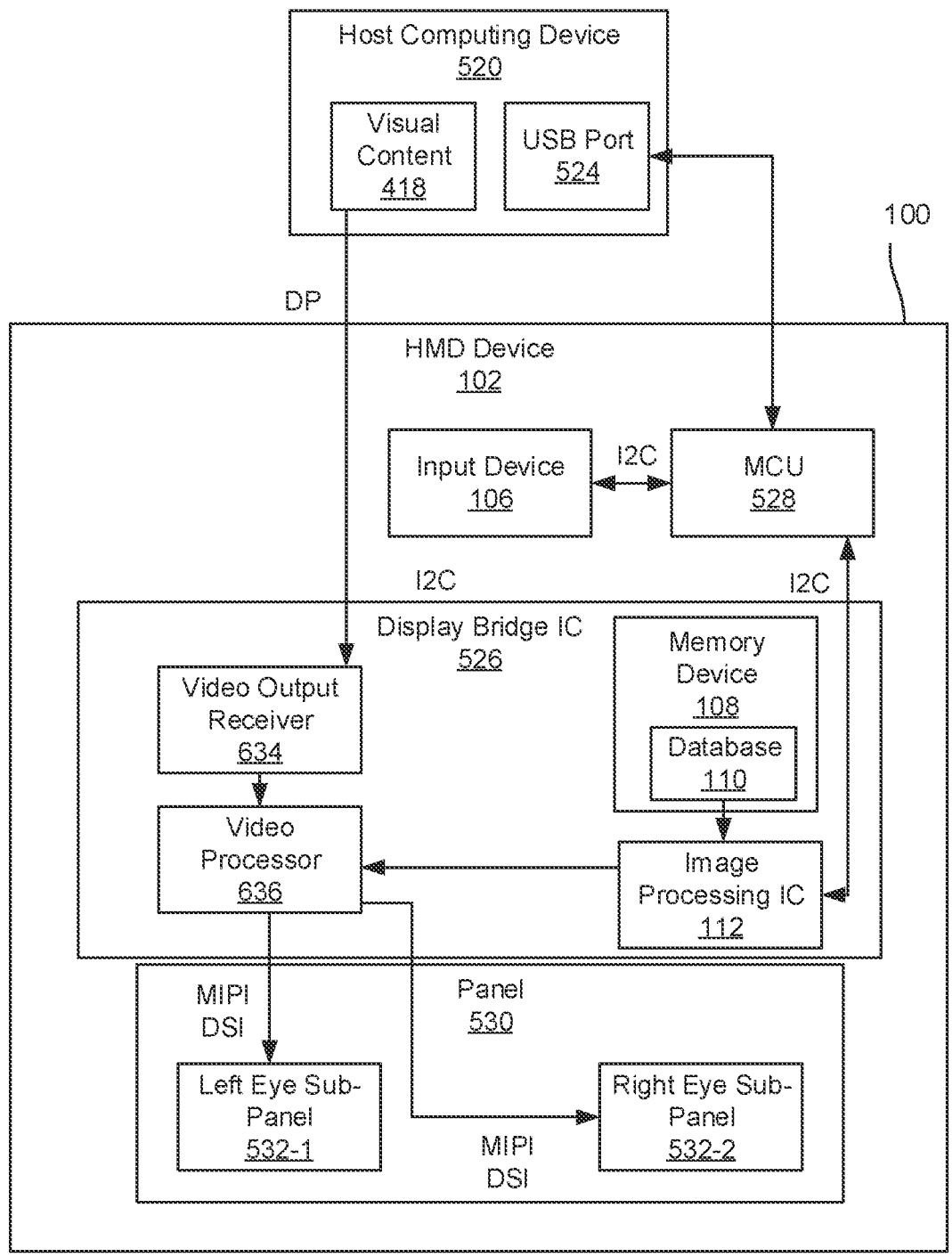
FIG. 6 is a hardware diagram of a display system with a HMD device for generating status messages, according to an example of the principles described herein.

FIG. 6 is a hardware diagram of a display system (100) with an HMD device (102) for generating status messages (416), according to an example of the principles described herein. In the example depicted in FIG. 6, the image processing integrated circuit (112) and memory device (108) are disposed on the display bridge integrated circuit (526). That is, the image processing integrated circuit (112) and memory device (108) are embedded on the display bridge integrated circuit (526). As such, the display bridge integrated circuit (526) may process the video output, via for example, a video output receiver (634) and video processor (636). The image processing integrated circuit (112) provides the display bridge integrated circuit (526) with the capability of detecting, generating, and providing status messages (FIG. 4, 416) onboard the HMD device (102) rather than relying on the separate host computing device (520).

Figure 7:
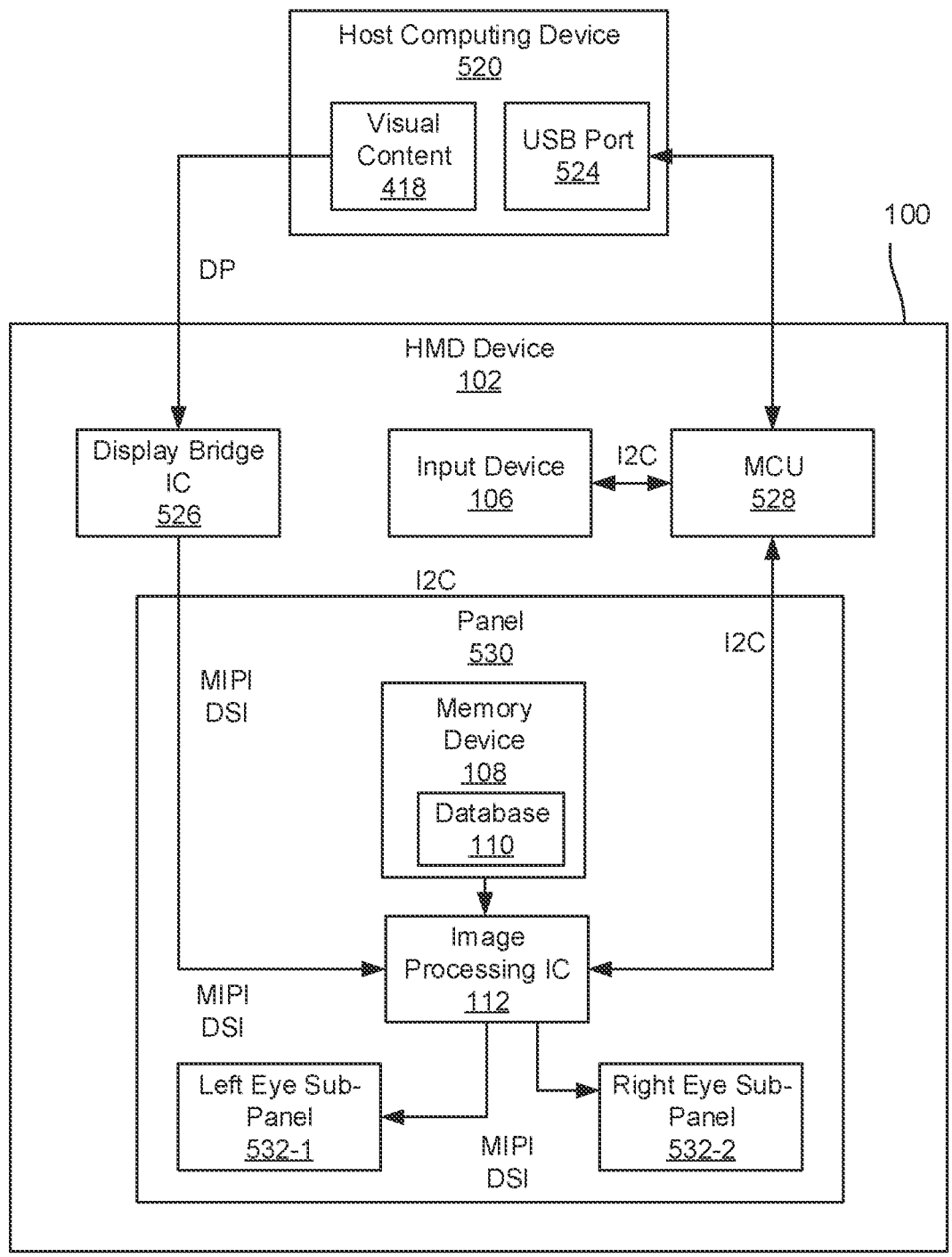
FIG. 7 is a hardware diagram of a display system with a HMD device for generating status messages, according to an example of the principles described herein.

FIG. 7 is a hardware diagram of a display system (100) with an HMD device (102) for generating status messages (FIG. 4, 416), according to an example of the principles described herein. In the example depicted in FIG. 7, the image processing integrated circuit (112) and the memory device (108) are disposed on the display panel (530) downstream of the display bridge integrated circuit (526). In this example, the image processing integrated circuit (112) directly flips certain pixels to certain predefined colors regardless of the external visual content (418) such that the status messages (FIG. 4, 416) directly show on the panels (528) and/or sub-panels (530) and override the visual content (418) from the host computing device (520). That is, the imaging processing integrated circuit (112) may lock pre-determined pixel set(s) into specific color(s) when receiving the control signal from the MCU (528) regardless of the visual content (418) from the host computing device (520). The pre-determined pixel set may form human readable text status messages (FIG. 4, 416) such as the IPD calibration value. The system depicted in FIG. 7 may allow the image processing integrated circuit (112) to operate without processing MIPI/DisplayPort protocols and frames. As such, the HMD device (102) computation power may be reduced.

Figure 8:
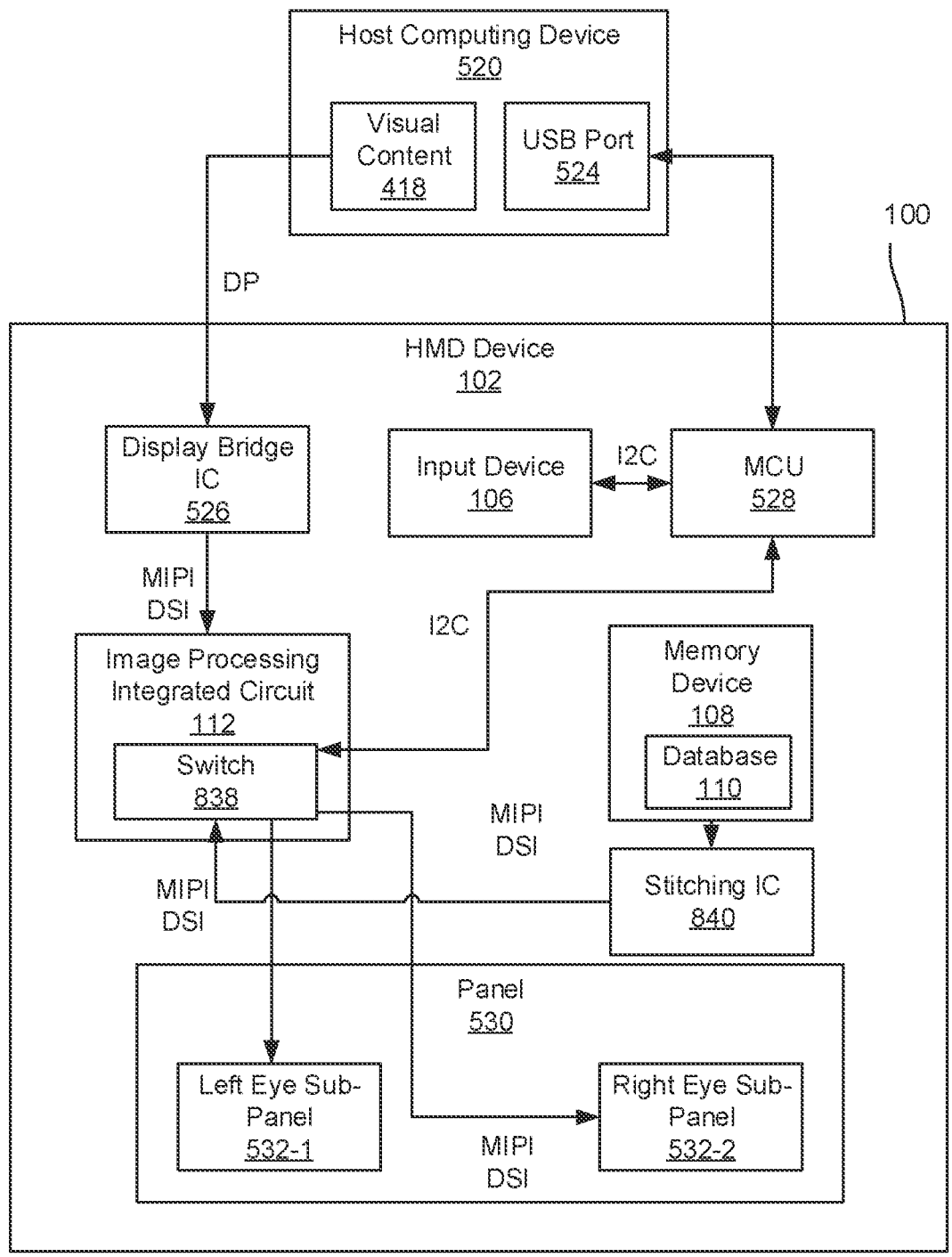
FIG. 8 is a hardware diagram of a display system with a HMD device for generating status messages, according to an example of the principles described herein.

FIG. 8 is a hardware diagram of a display system (100) with an HMD device (102) for generating status messages (FIG. 4, 416), according to an example of the principles described herein. In the example depicted in FIG. 8, the image processing integrated circuit (112) includes a switch (838) to switch a display on the panel (528) and/or sub-panels (530) between the visual content (418) and the status message (FIG. 4, 416). That is, the switch (838) changes a video source when the input device (106) registers a detected condition such as an IPD adjustment. As depicted in FIG. 8, the MCU (528) may determine which video source to be output to the panel (528) and/or sub-panel (530). When the input device (106) does not register an input device (106) detected condition, the visual content (520) from the host device (520) is output to the panel (530). However, when the interrupt of IPD configuration is raised, the switch (838) switches the video source to the status message (FIG. 4, 416).

In an example, the database (110) provides multiple still images. In this example, the stitching integrated circuit (840) may stitch a sequence of status messages (FIG. 4, 416) together to present a video display of a sequence of status messages (FIG. 4, 416) as the input changes. That is, as a user is adjusting an IPD adjustment device, a series of status messages (FIG. 4, 416) may be triggered such that a real-time update of the IPD calibration value is presented to the user.

Figure 9:
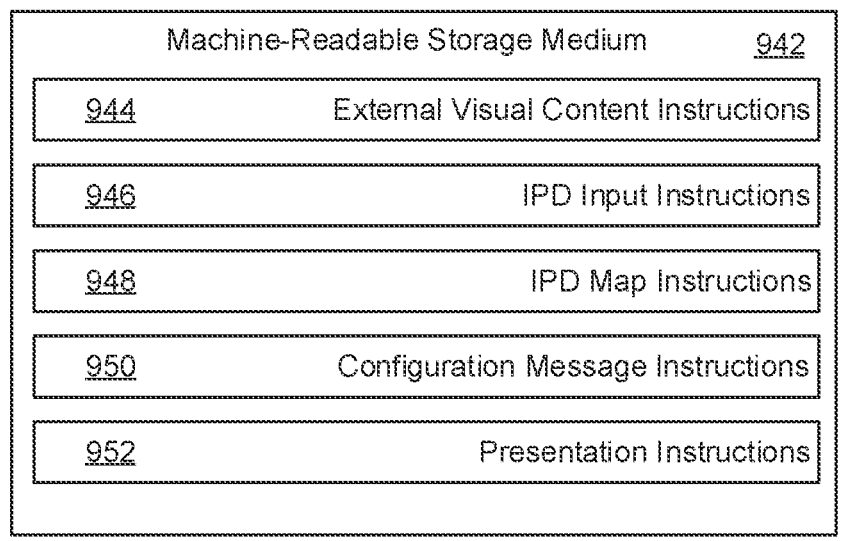
FIG. 9 depicts a non-transitory machine-readable storage medium for generating status messages on a HMD device, according to an example of the principles described herein.

FIG. 9 depicts a non-transitory machine-readable storage medium (942) for generating status messages (FIG. 4, 416) on an HMD device (FIG. 1, 102), according to an example of the principles described herein. To achieve its desired functionality, the display system (FIG. 1, 100) includes various hardware components. Specifically, the display system (FIG. 1, 100) includes a processor and a machine-readable storage medium (942). The machine-readable storage medium (942) is communicatively coupled to the processor. The machine-readable storage medium (942) includes a number of instructions (944, 946, 948, 950, 952) for performing a designated function. In some examples, the instructions may be machine code and/or script code.

The machine-readable storage medium (942) causes the processor to execute the designated function of the instructions (944, 946, 948, 950, 952). The machine-readable storage medium (942) can store data, programs, instructions, or any other machine-readable data that can be utilized to operate the display system (FIG. 1, 100). Machine-readable storage medium (942) can store machine readable instructions that the processor of the display system (FIG. 1, 100) can process, or execute. The machine-readable storage medium (942) can be an electronic, magnetic, optical, or other physical storage device that contains or stores executable instructions. Machine-readable storage medium (942) may be, for example, Random-Access Memory (RAM), an Electrically Erasable Programmable Read-Only Memory (EEPROM), a storage device, an optical disc, etc. The machine-readable storage medium (942) may be a non-transitory machine-readable storage medium (942).

Referring to FIG. 9, external visual content instructions (944), when executed by the processor, cause the processor to, receive external visual content (FIG. 4, 418) from a host computing device (FIG. 5, 520) to display on an HMD device (FIG. 1, 102). IPD input instructions (946), when executed by the processor, cause the processor to, receive input at an input device (FIG. 1, 106) on the HMD device (FIG. 1, 102). In an example, the input indicates an IPD of the HMD device (FIG. 1, 102). IPD map instructions (948), when executed by the processor, cause the processor to, map a received IPD value to a status message (FIG. 4, 416) stored on a database (FIG. 1, 110), which status message (FIG. 4, 416) displays the mapped IPD. Configuration message instructions (950), when executed by the processor, cause the processor to, extract from the database (FIG. 1, 110) on the HMD device (FIG. 1, 102), a status message (FIG. 4, 416) mapped to the received IPD value. Presentation instructions (952), when executed by the processor, cause the processor to, present the status message (FIG. 4, 416) on the HMD device (FIG. 1, 102), independent of the external visual content (FIG. 5, 520) signal from the host computing device (FIG. 5, 520).

In summary, using such a system, method, and machine-readable storage medium may, for example, 1) provide IPD, and other, status messages, even when a video cable from a host computing device is disconnected; 2) provide a consistent and comprehensive reporting system; and 3) does not overwhelm the HMD hardware components. However, it is contemplated that the devices disclosed herein may address other matters and deficiencies in a number of technical areas, for example.

What is claimed is:

1. A display system, comprising: a head-mounted display (HMD) device to display visual content on a display panel; an input port to receive external visual content to be displayed on the HMD device from a connected host computing device; an input device on the HMD device to receive input regarding an interpupillary distance (IPD) of the HMD device; a memory device on the HMD device to store a database which is to hold a number of status messages related to the IPD of the HMD device; and independent of the connected host computing device: an image processing integrated circuit on the HMD device which extracts from the database and based on the IPD, a status message to display on the HMD device, which status message indicates the IPD and presents the status messages on the HMD device.

2. The display system of claim 1, wherein the input device further comprises a device selected from the group consisting of:
a thermal sensor;
a gyroscope;
a communication signal sensor;
a network connectivity sensor;
a battery level sensor; and
an optical sensor.

3. The display system of claim 1, wherein:
the HMD device is a stereoscopic display device; and
that database comprises a left eye image and a right eye image for each status message.

4. The display system of claim 1, wherein the database stores a status message per input value of the input device.

5. The display system of claim 1, further comprising:
a display bridge integrated circuit to transmit the external visual content to the display panel; and
a micro control unit to receive input from the input device.

6. The display system of claim 5, wherein the image processing integrated circuit receives as input:
an output from the display bridge integrated circuit; and
an output from the micro control unit.

7. The display system of claim 5, wherein the image processing integrated circuit and database are disposed on the display bridge integrated circuit.

8. The display system of claim 5, wherein the image processing integrated circuit and database are disposed on the display panel downstream of the display bridge integrated circuit.

9. The display system of claim 5, further comprising a switch to switch a display on the display panel between the external visual content and the status message.

10. The display system of claim 1, wherein the database comprises status messages adjusted to account for lens distortion when presented on the HMD.

11. The display system of claim 1, wherein the input device comprises a potentiometer which has different voltage level outputs, each voltage level output indicating a distance between eye cups of the HMD device.

12. The display system of claim 11, wherein the number of status messages are indexed by voltage level outputs.

13. The display system of claim 1, wherein the number of status messages are indexed by IPD.

14. A method, comprising:
receiving input from an input device on a head-mounted display (HMD) device, the input indicating an interpupillary distance (IPD) of the HMD device;
while not connected to host computing device:
extracting from a database on the HMD device and based on the IPD, a status message to display on the HMD device, which status message indicates the IPD; and displaying the status message of the IPD on a display panel of the HMD device.

15. The method of claim 14, wherein displaying the status message on the display panel comprises superimposing the status message over external visual contents provided by a computing device connected to the HMD device.

16. The method of claim 14, wherein displaying the status message comprises overriding pixels of the external visual content to pixels designated in the status message.

17. The method of claim 14, further comprising stitching a sequence of status messages to present a video display of a sequence of status messages as the input changes.

18. The method of claim 14, further comprising adjusting the status message to account for lens distortion of the IPD measurement associated with the status message.

19. A non-transitory machine-readable storage medium encoded with instructions executable by a processor, the machine-readable storage medium comprising instructions to:

receive external visual content from a connected computing device to display on a head-mounted display (HMD) device;
 receive input from an input device on the HMD device, the input indicating an interpupillary distance (IPD) of the HMD device;
 independent of the connected computing device:
  map a received IPD value to a status message stored on a database, which status message displays the mapped IPD;
  extract from the database on the HMD device, a status message mapped to the received IPD value; and
  presenting the status message on the HMD device.

20. The non-transitory machine-readable storage medium of claim 19, further instructions executable by the processor to convert an inter-integrated circuit (I2C) signal from the input device to a mobile industry processor interface display serial interface (MIPI DSI) signal for a display panel of the HMD device.

* * * * *